Nov. 13, 1928.  
E. ZBINDEN  
1,691,598  
INTERNAL COMBUSTION ENGINE LOCOMOTIVE  
Filed March 12, 1926
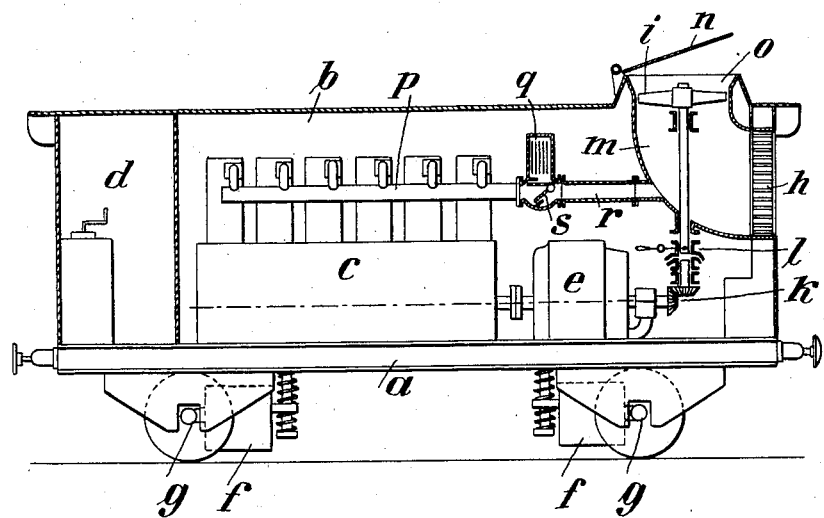

Patented Nov. 13, 1928.

1,691,598

UNITED STATES PATENT OFFICE.

EUGEN ZBINDEN, OF WINTERTHUR, SWITZERLAND, ASSIGNOR TO SULZER FRERES SOCIETE ANONYME, OF WINTERTHUR, SWITZERLAND.

INTERNAL-COMBUSTION-ENGINE LOCOMOTIVE.

Application filed March 12, 1926, Serial No. 94,140, and in Germany August 28, 1925.

This invention relates to locomotives driven by internal combustion engines and has for its object to provide improved means for controlling the action of the radiator through which the cooling water is circulated and for ventilating the interior of the locomotive.

According to this invention not only is the radiator provided with a fan which can be operated at will but in addition the induction pipe of the internal combustion engine is so arranged that it can be placed into communication either with the conduit through which cooling air of the radiator flows or with the interior of the locomotive. Thus air can be drawn through the radiator either by the fan or by the induction pipe of the engine, enabling the cooling action to be controlled without varying the speed of the fan or the effective area of the radiator and further the proper ventilation of the interior of the locomotive can be assured by drawing the combustion air for the engine from the casing without in any way diminishing the amount of air drawn by the fan through the radiator. This simplifies the construction of the locomotive since it is unnecessary to provide means for varying the speed of the fan or to employ a radiator of the type having a variable number of sections or stages.

One construction according to this invention is illustrated diagrammatically by way of example in the accompanying drawing.

The frame of the locomotive $a$ carries a body or casing $b$ containing an internal combustion engine $c$ and the driver's cab $d$. In the example shown the engine $c$ is directly coupled to an electric generator $e$ which supplies current to motors $f$ connected to or carried by the axles $g$ of the driving wheels.

The radiator $h$ through which the cooling water is circulated is of a well-known type and is provided with a fan $i$ driven from the shaft of the dynamo $e$ through bevel pinions $k$, this fan being furnished with a clutch $l$ which can be disconnected at will from the driving shaft. The fan is mounted to rotate in a fan chamber or conduit $m$ through which air is drawn through the radiator, the delivery end $o$ of this conduit communicating with the atmosphere through the roof of the body and having a hinged cap or cover $n$.

The induction pipe $p$ of the engine is connected to an air intake chamber $q$ arranged inside the body or casing $b$ of the locomotive and is also connected to a pipe $r$ leading to the fan chamber or conduit $m$, a valve $s$ being provided by means of which the induction pipe can be connected either to the chamber $q$ or to the conduit $m$.

In summer when the maximum amount of cooling air is required and the body of the vehicle has to be ventilated, the cap or cover $n$ is opened, the fan coupled to its driving shaft and the valve $s$ moved into the position shown by full lines in the drawing. As a result a draught will be created inside the locomotive which will thus be ventilated whilst the full output of the fan will be employed to draw air through the radiator of the engine. On the other hand in winter when but little cooling air is required and it is not necessary to ventilate the interior of the locomotive, the cap or cover $n$ will be closed, the fan disconnected from the driving shaft and the valve $s$ moved into the upper position shown by dotted lines in the drawing. The engine will then draw sufficient air through the radiator to effect the cooling of the water without creating a draught inside the locomotive.

What I claim is:

In an internal combustion engine driven locomotive the combination with a radiator, of a housing forming an air chamber back of said radiator, a disconnectible fan positioned in said chamber and an engine intake conduit opening into said chamber, whereby air may be drawn through said radiator and into said chamber by the suction of said fan and the suction of said intake conduit, and means for varying the proportion of air drawn through said radiator by said fan and by said intake conduit.

In testimony whereof I have affixed my signature.

EUGEN ZBINDEN.